(12) United States Patent
Singh

(10) Patent No.: US 7,836,102 B2
(45) Date of Patent: Nov. 16, 2010

(54) METHOD AND SYSTEM FOR ENHANCING SOFTWARE DOCUMENTATION AND HELP SYSTEMS

(75) Inventor: Gurbir Singh, Fremont, CA (US)

(73) Assignee: Cadence Design Systems, Inc., San Jose, CA (US)

(*) Notice: Subject to any disclaimer, the term of this patent is extended or adjusted under 35 U.S.C. 154(b) by 129 days.

(21) Appl. No.: 12/345,641

(22) Filed: Dec. 29, 2008

(65) Prior Publication Data

US 2009/0138519 A1 May 28, 2009

Related U.S. Application Data

(62) Division of application No. 10/384,102, filed on Mar. 6, 2003.

(60) Provisional application No. 60/410,516, filed on Sep. 13, 2002.

(51) Int. Cl.
*G06F 7/00* (2006.01)
*G06F 17/30* (2006.01)

(52) U.S. Cl. .................. 707/805; 345/705; 702/22; 715/234; 715/209

(58) Field of Classification Search ............ None
See application file for complete search history.

(56) References Cited

U.S. PATENT DOCUMENTS 5,535,323 A 7/1996 Miller et al.

(Continued)

OTHER PUBLICATIONS

Gurbir Singh and Barbara Heninger, "Cadence Product Documentation: Supporting a Virtual Library Across Releases," International Cadence User Group Conference, Sep. 16-18, 2002, San Jose, California.

(Continued)

*Primary Examiner*—Sathyanarayan Pannala
(74) *Attorney, Agent, or Firm*—Vista IP Law Group LLP

(57) ABSTRACT

A method and system for enhancing software documentation and help systems. In one embodiment, a virtual library for a selected combination of tools is created. The virtual library is then linked to the tools in the selected combination of tools. In another embodiment, a combination of tools for designing a complex software system is selected from one or more software releases. The one or more software releases comprises a plurality of available tools. The selected combination of tools comprises less than all of the plurality of available tools. Each of the plurality of available tools is associated with one or more documents. Access to only those one or more documents associated with tools in the selected combination of tools is provided.

31 Claims, 6 Drawing Sheets

U.S. PATENT DOCUMENTS

| | | | |
|---|---|---|---|
| 5,754,176 A | 5/1998 | Crawford | |
| 5,907,845 A * | 5/1999 | Cox et al. | 707/999.102 |
| 6,208,338 B1 | 3/2001 | Fischer et al. | |
| 6,389,434 B1 * | 5/2002 | Rivette et al. | 715/209 |
| 6,482,156 B2 | 11/2002 | Lliff | |
| 6,654,747 B1 | 11/2003 | Van Huben et al. | |
| 6,724,401 B1 | 4/2004 | Hennum et al. | |
| 6,845,395 B1 | 1/2005 | Blumenau et al. | |
| 6,862,533 B2 * | 3/2005 | Strehlau et al. | 702/22 |
| 6,928,637 B2 | 8/2005 | Leherbauer | |
| 6,938,021 B2 | 8/2005 | Shear et al. | |
| 7,356,537 B2 * | 4/2008 | Reynar et al. | 715/234 |
| 2002/0054138 A1 | 5/2002 | Hennum | |
| 2002/0059054 A1 | 5/2002 | Bade et al. | |
| 2003/0016238 A1 | 1/2003 | Sullivan et al. | |
| 2004/0093558 A1 | 5/2004 | Weaver | |

OTHER PUBLICATIONS

Notice of Allowance dated May 12, 2010 for U.S. Appl. No. 10/384,102.

* cited by examiner

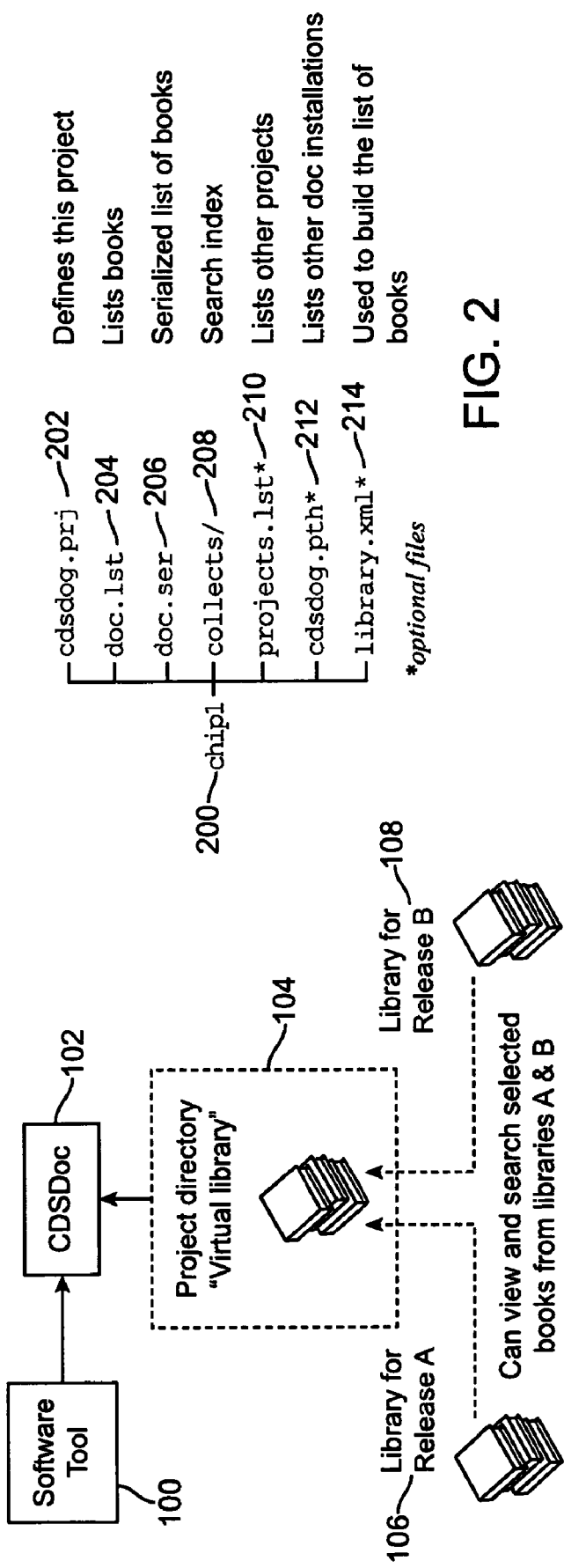

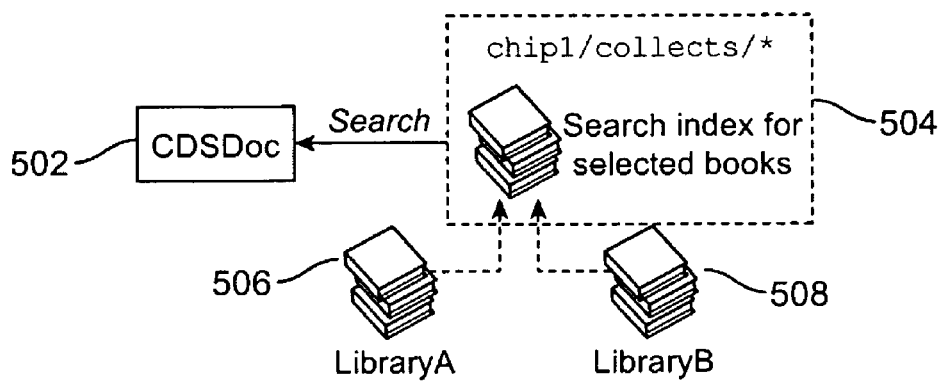

FIG. 5

```
server:/u1/projects/chip1/projects.lst
    /net/server1/u1/projects/chip1
    /net/server1/u1/projects/simulate
    /net/server2/u1/projects/bigChip
```

FIG. 6

```
server:/u1/projects/chip1/cdsdoc.pth
    /net/server1/ic50
    /net/server2/ldv42
```

FIG. 7

```
/chip1/library.xml
    <!DOCTYPE Library SYSTEM "library.dtd">
    <library>
     <hierarchy path="/net/server1/ic50">
      <product name="AMS Designer"> </product>
      <product name="Analog IC"> </product>
     </hierarchy>
    </hierarchy path="/net/server2/ldv42">
      <family name="Functional Verification"> </family>
     </hierarchy>
    </library>
    </library>
```

FIG. 8

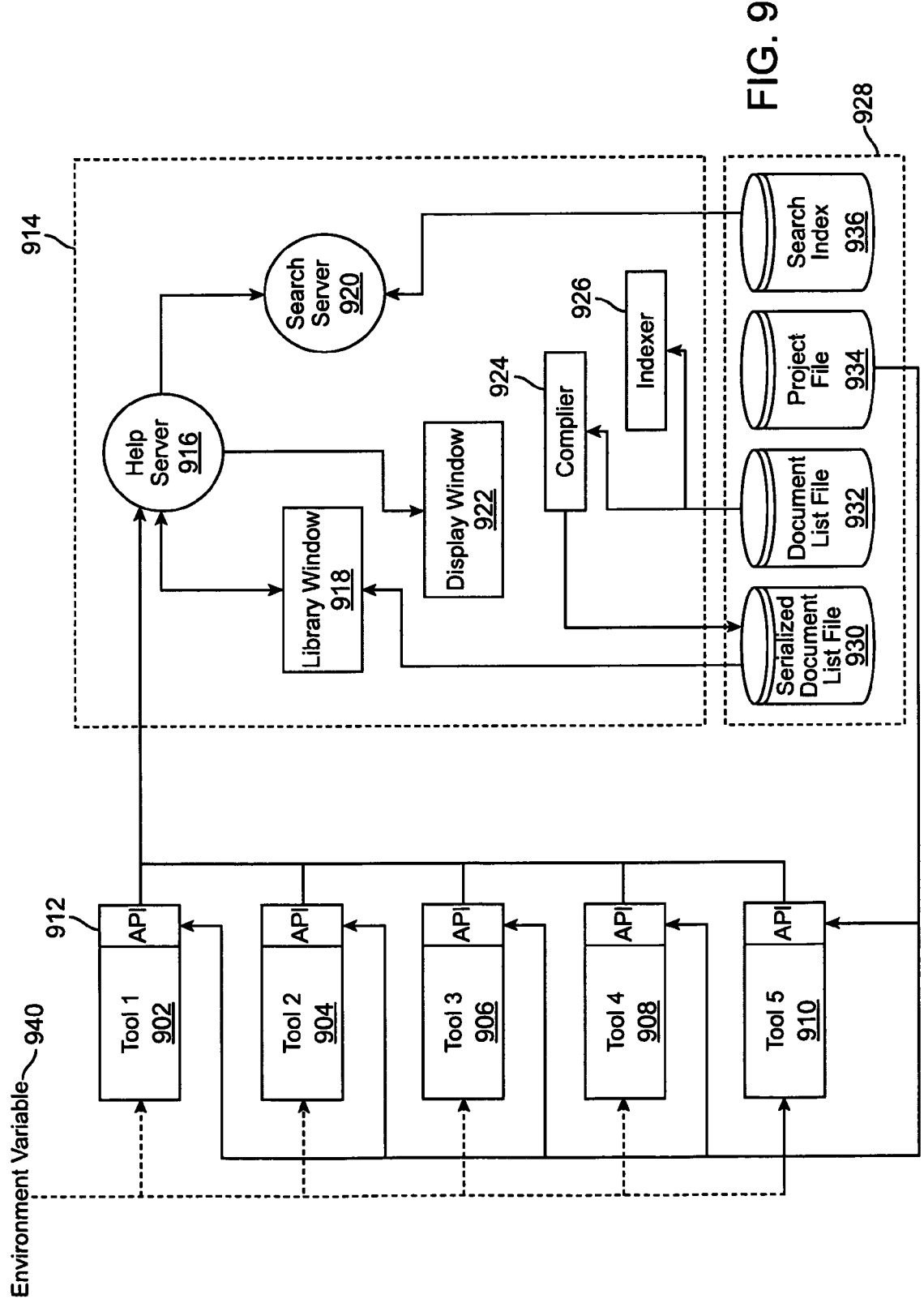

METHOD AND SYSTEM FOR ENHANCING SOFTWARE DOCUMENTATION AND HELP SYSTEMS

CROSS-REFERENCE TO RELATED APPLICATIONS

The present application is a divisional of U.S. application Ser. No. 10/384,102, filed on Mar. 6, 2003, which claims the benefit of U.S. Provisional application Ser. No. 60/410,516, filed on Sep. 13, 2002, both of which are hereby incorporated by reference in their entirety.

The present application is related to co-pending U.S. application Ser. No. 12/345,621, filed on Dec. 29, 2008, which is hereby incorporated by reference in its entirety.

BACKGROUND AND SUMMARY

The present invention is related to documentation and help systems. More particularly, the present invention is directed to a method and system for enhancing software documentation and help systems.

In the electronic design automation (EDA) industry, tools for designing integrated circuits and printed circuit boards are packaged and distributed in product suites or tool sets in what are known as software releases. For a complex software design project, designers may employ a combination of tools from several software releases installed on a computer network. These tools often use a documentation and help system to display the documentation for the tools. The documentation and help system may be standalone or integrated into the tool. The documentation may be split into several document or help sets or may be organized into one giant document set shared by all of the tools in the software release.

Earlier documentation and help systems display and search help sets for a single tool in a software release, a predetermined combination of tools within a release, or an entire release at a time. The help sets are statically used by a tool or shared between tools in a release. Earlier documentation and help systems are not designed to browse and search documentation for an arbitrary combination of tools which spans multiple software releases. Further, they do not allow concurrent access to documentation for such arbitrary combinations of tools. For example, a tool could not ask the help system to browse and search documentation for one arbitrary combination of tools and while another tool asks the same run-time instance of the help system to browse and search documentation for another combination of tools. This is desirable when the two tools are participating in different design projects (or design flows) but sharing the same help system.

Additionally, earlier documentation and help systems do not allow one run-time instance of a tool to browse and search documentation for one combination of tools and another concurrent run-time instance of the same tool to browse and search documentation for a different combination of tools. This is desirable when the same tool participates in different design projects, each with its own combination of tools. Moreover, when tools are used from multiple software releases, it is possible to invoke more than one instance of a documentation and help system.

Rather than viewing document sets separately and possibly starting multiple instances of a documentation and help system, as described above, users would prefer a documentation and help system that allows them to browse and search documents for only the tools being used in a design project. Since documents may be stored in various locations across a network, users would also prefer to be able to find documents without knowing where the documents are installed. In other words, the installed software releases, which contain tools and documents, should be transparent to the users. Additionally, users would prefer to eliminate the overhead of browsing and searching through large volumes of documents that are part of the software releases but do not apply to the tools in use. Further, users would prefer to use a single version and instance of a documentation and help system in a design project. Moreover, at any given time, a number of projects may be in progress, each project using a different combination of tools. Thus, users would like to have concurrent access to a different set of documents for each project even though each release has a static set of documents.

The present invention provides a method and system for enhancing software documentation and help systems. In one embodiment, a virtual library for a selected combination of tools is created. The virtual library is then linked to tools in the selected combination of tools. In another embodiment, a combination of tools is selected from one or more software releases. The software releases comprise a plurality of available tools. The selected combination of tools comprises less than all of the plurality of available tools. Each available tool is associated with one or more documents. Access to only those one or more documents associated with tools in the selected combination of tools is provided.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

FIG. 1 illustrates a virtual library for a selected combination of tools from two software releases according to one embodiment of the present invention.

FIG. 2 shows contents of a sample project directory according to an embodiment of the present invention.

FIG. 3 shows a sample project file according to one embodiment of the present invention.

FIG. 4 shows a sample document list file according to an embodiment of the present invention.

FIG. 5 illustrates a search index for a virtual library according to one embodiment of the present invention.

FIG. 6 shows a sample project list file according to an embodiment of the present invention.

FIG. 7 shows a sample path file according to one embodiment of the present invention.

FIG. 8 shows a sample library file according to an embodiment of the present invention.

FIG. 9 depicts how tools access a documentation and help system according to one embodiment of the present invention.

DETAILED DESCRIPTION

Figure 10:
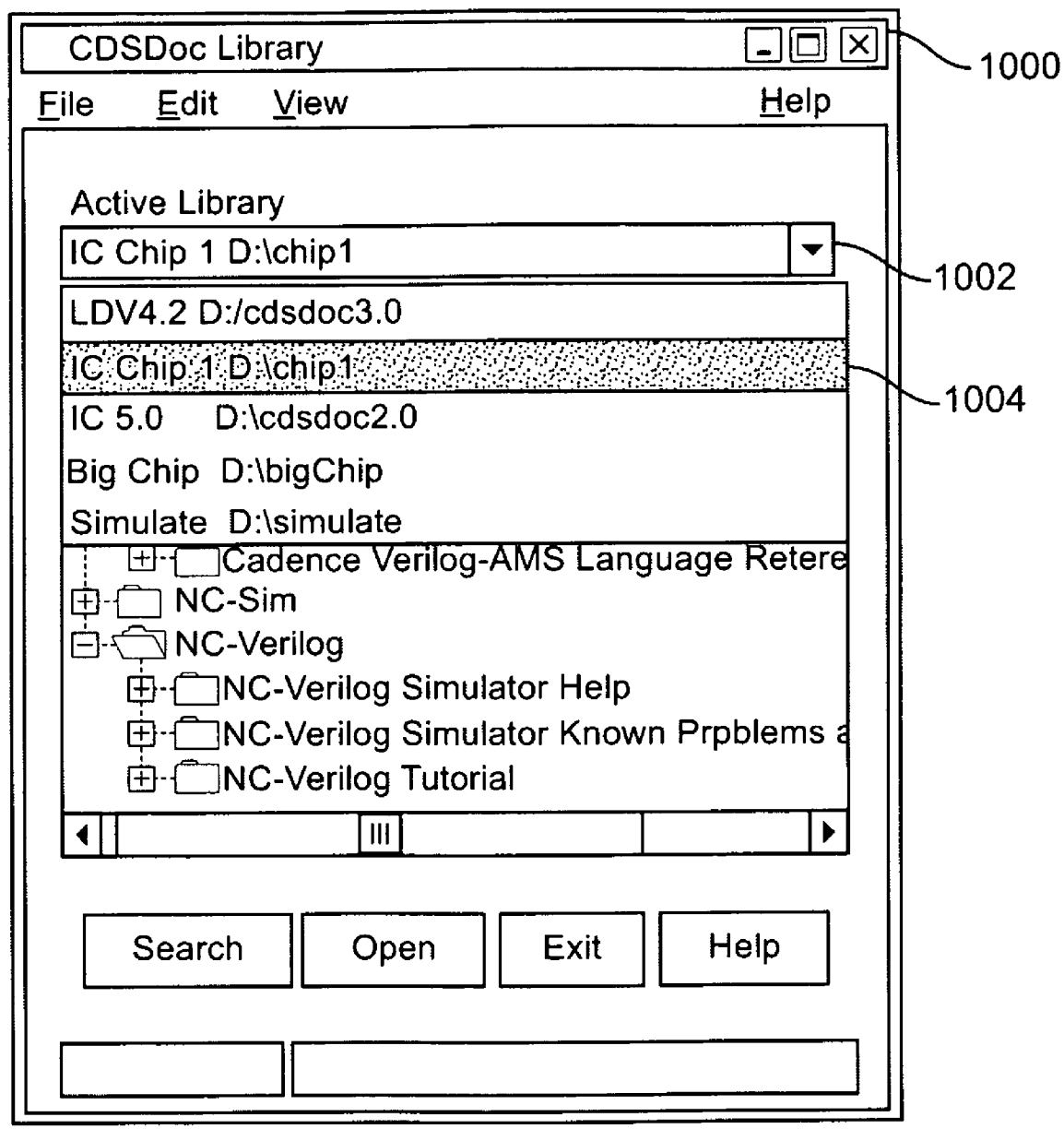
FIG. 10 illustrates a library window according to an embodiment of the present invention.

Designers of complex software systems often use suites of software tools, packaged and distributed in separate software releases. For a software design project, users may employ a particular combination of tools from the various tool suites at their disposal. As a result, users want to be able to browse and search selected documentation for tools that may be from multiple software releases.

The present invention provides a method and system for enhancing software documentation and help systems. The documentation and help system used to illustrate embodiments of the invention is a proprietary system used in the EDA industry called CDSDoc, which is manufactured and sold by Cadence Design Systems, Inc. of San Jose, Calif. Although various embodiments of the invention are described in the context of the EDA tools, CDSDoc, and UNIX operating system, embodiments of the invention are not limited to EDA tools, CDSDoc, or UNIX. The methodology and solution described herein is applicable to any documentation and help system for any software tool in any environment. For example, the software release could be Microsoft Office XP running on Microsoft Windows XP operating system. Microsoft software is bundled with an integrated documentation and help system. Microsoft Office XP and Windows XP are manufactured and sold by Microsoft Corp. of Redmond, Wash.

Documentation in CDSDoc is organized into books and libraries. Each book resides in a directory of its own and has several document files. Each library consists of several book directories. Other documentation and help systems may be organized into books, help sets, document sets, or single document files. A virtual library can be thought of as a portal to browse and search selected parts of a set of actual document libraries. In an embodiment of the invention, a project directory is used to provide a physical representation and description of a virtual library. The project directory contains a list of books, document or help sets, or individual document files to be made available to any user of the project. The directory also contains a project-specific search index for all those books. For some documentation and help systems, including CDSDoc, files that define the path to and the version of the document and help system to be used for that project are also included in the project directory.

FIG. 1 shows how information in a project directory 104 is used by CDSDoc 102 in an embodiment of the invention. CDSDoc 102 opens a selected list of documents from libraries 106-108. It uses a full-text search index built especially for the selected documents located in project directory 104. In the embodiment, the dotted arrows show that documents are not physically copied into the project directory. Instead, the documents are used to build the search index and are displayed directly from their respective libraries 106-108 at run-time. Using virtual library 104 allows a user of software tool 100 to view and search all appropriate documents for the project. If users have several different design projects, they can set up several virtual libraries, each one specific to the tools used in that design project. In one embodiment, multiple design projects may be run concurrently on a single machine, each with its own virtual library.

According to an embodiment of the invention, a virtual library includes a project file, a document list file, a serialized document list file, and a search index. In other embodiments of the invention, the virtual library may also include a project list file, a path file, and/or a library file.

A project file defines the project name and contains path and version information used to invoke and communicate with documentation and help system processes. In one embodiment, the latest available version of a documentation and help system from one of the software releases is used. Illustrated in FIG. 2 is project directory 200 with a list of files 202-214. In FIG. 2, cdsdoc.prj 202 is the name of the project file for virtual library 200 named chip1. FIG. 3 shows a sample cdsdoc.prj file 202. In the embodiment, IC Chip 1 is the project name, the version of CDSDoc that the project will use is 3.0, and the path to CDSDoc version 3.0 is /net/server1/ic50. In one embodiment, project name IC Chip 1 appears in a library window 1000 of the documentation and help system as illustrated in FIG. 10.

A document list file identifies all of the books that a user wants to view from one or more actual libraries included in software releases. In an embodiment, the document list file is written by hand. In one embodiment, absolute paths to the documents listed are needed. In FIG. 2, doc.lst 204 is the name of the document list file for virtual library 200. Illustrated in FIG. 4 is a sample doc.lst file 204. In the embodiment, paths to seven books (amsenvugKPNS, amsenvug, verilogamsref, anawavefm, nvclog, ncvlogtut, ncvlogKPNS) from two different releases (ic50 and ldv42) located on two different servers (server1 and server2) are included in doc.lst file 204. Other documentation and help systems may use paths to document sets, help sets, or document files.

A serialized document list file is a binary image of the run-time persistent object which contains books and documents listed in the document list file, i.e., it is the document list file in a documentation and help system-readable format. In another embodiment of the invention, a serialized document list file is not included in a virtual library if the document list file is already in a documentation and help system-readable format. In one embodiment, at run-time, a library window in the documentation and help system reads the serialized document list file and constructs the persistent object in memory to display books in the virtual library. In FIG. 2, doc.ser 206 is the name of the serialized document list file for virtual library 200. In one embodiment, a serialized document list file is derived from the document list file using a compiler included in the documentation and help system. In CDSDoc, users can use the cdsdocCompiler command to create a serialized document list file from a document list file. For example, the command cdsdocCompiler-project/u1/projects/chip1 creates a serialized document list file in virtual library 200.

A search directory for the virtual library contains a full-text search index that includes only those books listed in the document list file. This way, users of a particular project search only the books identified for their project. This can be a much smaller collection than the full-text search index shipped with each release, which contains pointers to all of the documents installed for that release. In FIG. 2, collects 208 is the name of the search directory for virtual library 200. In one embodiment, a search directory is constructed from the document list file using an indexer included in the documentation and help system. In CDSDoc, users can use the cdsdocIndexer command to create a search index from a document list file. For example, the command cdsdocIndexer-project/u1/projects/chip1 creates a search index in virtual library 200 that will be located in the directory/u1/projects/ chip1/collects. In one embodiment, only the search index is created. The books still reside in their respective release hierarchies and are not copied anywhere. FIG. 5 shows how CDSDoc 502 accesses collects search index 504 in project directory chip1 to search books in libraries 506-508 according to an embodiment of the invention.

A project list file contains pointers to other available virtual libraries so that users can choose from different virtual libraries while the documentation and help system is running. In one embodiment, as each virtual library is used, its reference is stored by the documentation and help system in a file used to add the virtual library name to the list of available hierarchies and libraries in the documentation and help system library window 1000 as illustrated in FIG. 10. The project list file allows a system administrator or user to load several virtual libraries in the documentation and help system library window at start up. In FIG. 2, projects.lst 210 is the name of the project list file for virtual library 200. Illustrated in FIG. 6 is a sample projects.lst file 210. In one embodiment, virtual libraries chip1, simulate, and bigChip are added to the list of available hierarchies and libraries in the documentation and help system library window 1000 as illustrated in FIG. 10.

A path file allows users to identify documentation hierarchies for separate software releases and load them into the documentation and help system library window at start up. The path file contains pointers to directories containing actual libraries included in the software releases. In FIG. 2, cdsdoc.pth 212 is the name of the path file for virtual library 200. Illustrated in FIG. 7 is a sample cdsdoc.pth file 212. In one embodiment, document hierarchies Ic50 and ldv42 are added to the list of available hierarchies and libraries in the documentation and help system library window.

A library file lists the product and/or family names of the tools used in the project from each release. The library file is created using a text editor in one embodiment. In anther embodiment, the library file is created using an XML editor. Using the documentation and help system compiler, a document list file can be generated from the library file. The generated document list file will include all of the books associated with the tools listed in the library file. Generating a document list file benefits users who do not know which book directory names to include in the file. Users know which tools they use, but they are unlikely to know all of the books associated with their tools, nor will they know all of the document directory names. In one embodiment, a mapping file is used in conjunction with the library file to generate the document list file. The mapping file maps internal tool names to external tool names. In another embodiment, only a library file is used when the internal tool names are identical to the external tool names.

In FIG. 2, library.xml 214 is the name of the library file for virtual library 200. Illustrated in FIG. 8 is a sample library.xml file 214. In the embodiment, AMS Designer and Analog IC are the product names of two tools from software release ic50 and Functional Verification is the family name of a group of tools from software release ldv42. The books associated with these tools will be included in the document list file generated from library.xml file 214. In CDSDoc, users can use the cdsdocCompiler command to generate a document list file from a library file. For example, the command cdsdocCompiler-project/u1/projects/chip1 -library creates a document list file in project directory chip1 200, which will include all of the book files for AMS Designer, Analog Waveform, and Functional Verification. In a further embodiment, a serialized document list file can also be derived from the library file using the documentation and help system compiler. The derived serialized document list file will also include all of the books associated with the tools listed in the library file.

To link a virtual library to a tool, an administrator or user sets an environment variable via a startup script (or tool) to point to the project directory. If the environment variable is set at startup, the tools linked to the documentation and help system API will use the documentation and help system identified by the project file in the project directory. Clicking Help in a tool starts the documentation and help system, if it is not already running.

FIG. 9 illustrates how tools access a documentation and help system according to an embodiment of the present invention. In FIG. 9, a selected combination of tools 902-910 use a virtual library 928. Virtual library 928 comprises a project file 934, a document list file 932, a serialized document list file 930, and a search index 936. Project file 934 identifies the name of virtual library 928 and the release hierarchy from which to start documentation and help system 914. Document list file 932 may be created from scratch or generated from a library file (not shown) using compiler 924. The library file may list the product and/or family names of the tools used in virtual library 928 from each release. Compiler 924 can generate serialized document list file 930 from document list file 932 or the library file. Search index 936 is constructed from document list file 932 using indexer 926.

A startup script or tool defines environment variable 940 to point to the project directory where virtual library 928 resides. Documentation and help system 914 has an application programming interface (API) 912 that allows tools 902-910 to send document and help requests to help server 916 in documentation and help system 914. At startup, tools 902-910 and API 912 get environment variable 940, i.e., tools 902-910 get a pointer to virtual library 928.

When a user clicks Help in any one of the tools 902-910, API 912 starts documentation and help system 914, if it is not already running, from the release hierarchy identified in project file 934 of virtual library 928. Help server 916 accepts requests from tools 902-910 and displays content in display window 922. Help server 916 also receives a pointer to virtual library 928 from tools 902-910 via API 912 and passes it on to library window 918 and search server 920. Library window 918 reads a list of document titles from serialized document list file 930 and allows users to choose which document to display in display window 922. Search server 920 uses search index 936 to search the documents in virtual library 928. In one embodiment, a standard web browser, for example, Netscape Navigator or Microsoft Internet Explorer, can be used as display window 922. In an alternative embodiment, library window 918 and display window 922 are merged into one window.

In another embodiment of the invention, one or more of tools 902-910 may be started with environment variable 940 pointing to a different virtual library. When a help request is sent to documentation and help system 914 from these tools, the same running instance of documentation and help system 914 displays and searches the second virtual library. Hence the same instance of documentation and help system 914 may be concurrently shared by a number of tools to browse and search any number of virtual libraries. In another embodiment, a number of instances of the same tool may concurrently share the same instance of documentation and help system 914 to browse and search a number of virtual libraries.

As described above, when a user has an environment variable set, whenever the user clicks Help in any tool or starts the documentation and help system standalone, the books associated with the virtual library to which the environment variable is pointing will load into the library window of the documentation and help system. FIG. 10 illustrates a library window 1000 according to an embodiment of the invention. In the embodiment, the user can click on pull-down button 1002 in library window 1000 to change from one library to another. Pull-down list 1004 displays any libraries the user has previously viewed through the documentation and help system, any libraries for separate software releases that are listed in the optional path file, and any projects/virtual libraries that are listed in the optional project list file. In FIG. 10, the virtual libraries listed are those identified in project.lst file 210 shown in FIG. 6. Each project title (IC Chip 1, Big Chip, and Simulate) is identified in the project list file in each of the individual project directories.

Figure 11:
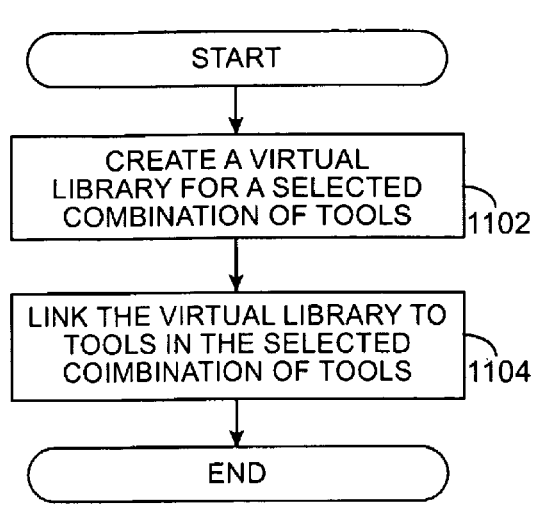
FIG. 11 depicts a flow chart of one embodiment of the present invention.

FIG. 11 depicts a process flow chart of an embodiment of the invention. In the embodiment, a virtual library is created for a selected combination of tools (1102). The virtual library is then linked to the tools in the selected combination of tools (1104). In one embodiment, the selected combination of tools comprises tools from a plurality of software releases.

Figure 12:
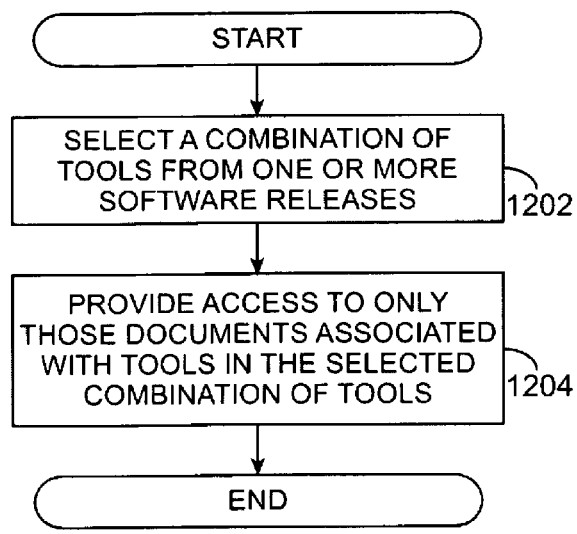
FIG. 12 is a flow diagram of a method for enhancing software documentation and help systems according to an embodiment of the present invention.

FIG. 12 shows a flow diagram of a method for enhancing software documentation and help systems according to an embodiment of the invention. In the embodiment, a combination of tools is selected from one or more software releases (1202). The one or more software releases comprise a plurality of available tools. The selected combination of tools comprises less than all of the available tools. Each tool is associated with one or more documents. Access to only those documents associated with the tools in the selected combination of tools is provided (1204).

Figure 13:
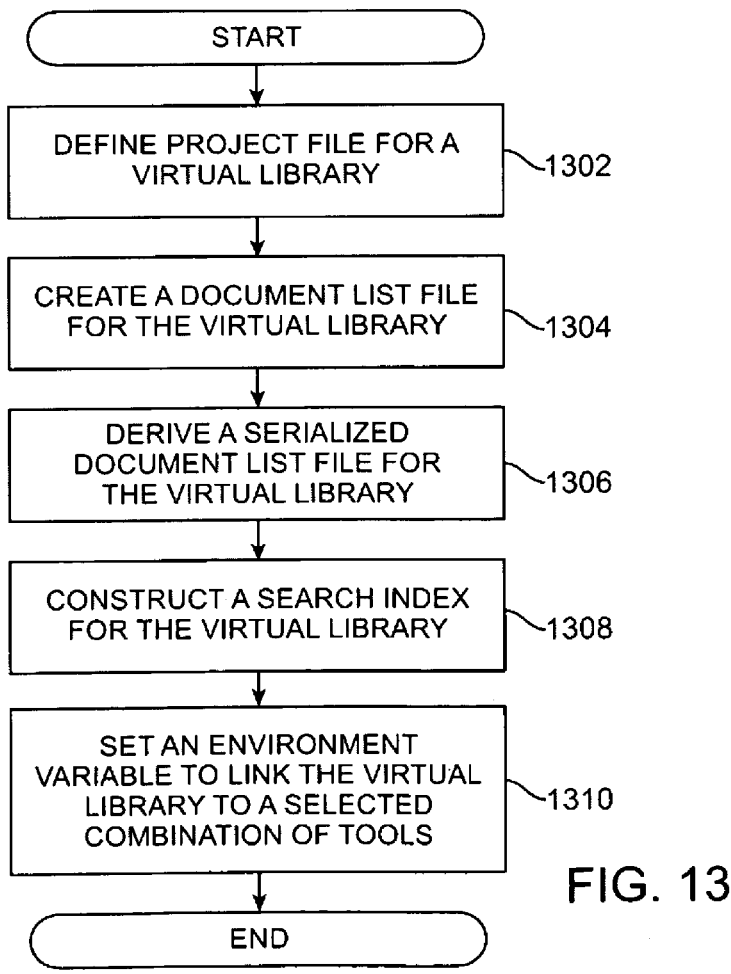
FIG. 13 shows a process flow of a method for enhancing software documentation and help systems according to another embodiment of the present invention.

FIG. 13 illustrates another method for enhancing software documentation and help systems. A project file for a virtual library is defined (1302). A document list file for the virtual library is created (1304). A serialized document list file is derived for the virtual library (1306). A search index is constructed for the virtual library (1308). An environment variable is set to link the virtual library to a selected combination of tools (1310).

The present invention allows users to define document libraries for software design projects and link them to the tools in those projects. In one embodiment, users are able to view documentation for tools through a single virtual library even though the documentation may be scattered over an intranet, with software releases or document sets having separately rooted paths.

Tools access the user-defined libraries. In an embodiment, the same tool may be invoked concurrently under different virtual library environments. For example, one instance of the tool may be accessing one virtual library whereas another instance of the same tool may concurrently be accessing another virtual library. In one embodiment, the virtual library applied to the tool is determined at run-time based on the project the tool is part of, i.e., the virtual library accessed by the tool is determined dynamically. Users have the ability to browse and search the virtual libraries through the documentation and help system. Additionally, once a tool is linked to the API of a documentation and help system, the tool can participate in an unlimited number of virtual libraries without any change to the tool software according to an alternative embodiment of the invention.

In another embodiment, product set to document set mapping is included. For example, if core documents are associated with each product or family of products, virtual libraries may be defined as abstractions using product or family names. The library abstractions can then be compiled into actual document references using a compiler according to one embodiment of the invention.

Since the project definition of a virtual library can include paths to documentation and help system executables, an entirely new help system may be installed at this path to replace the old one as long as it complies with the documentation and help system API protocol. Users have the ability to view actual libraries installed with the software as well as virtual libraries using one graphical user interface according to one embodiment of the invention. Additionally, users have the option of switching between libraries.

Figure 14:
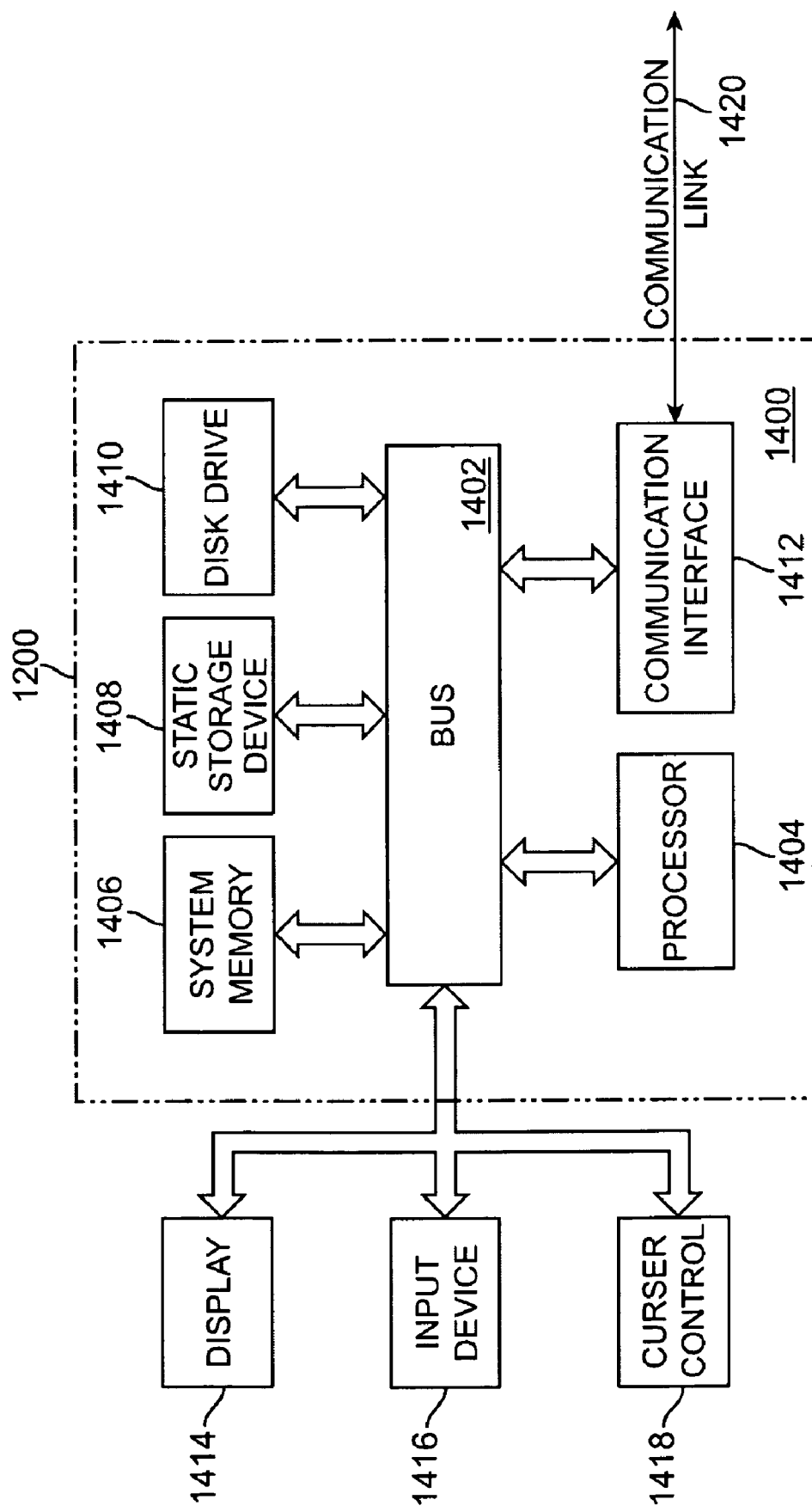
FIG. 14 is a diagram of a computer system with which embodiments of the present invention can be implemented.

FIG. 14 is a block diagram of a computer system 1400 suitable for implementing an embodiment of the present invention. Computer system 1400 includes a bus 1402 or other communication mechanism for communicating information, which interconnects subsystems and devices, such as processor 1404, system memory 1406 (e.g., RAM), static storage device 1408 (e.g., ROM), disk drive 1410 (e.g., magnetic or optical), communication interface 1412 (e.g., modem or ethernet card), display 1414 (e.g., CRT or LCD), input device 1416 (e.g., keyboard), and cursor control 1418 (e.g., mouse or trackball).

According to one embodiment of the invention, computer system 1400 performs specific operations by processor 1404 executing one or more sequences of one or more instructions contained in system memory 1406. Such instructions may be read into system memory 1406 from another computer readable medium, such as static storage device 1408 or disk drive 1410. In alternative embodiments, hard-wired circuitry may be used in place of or in combination with software instructions to implement the invention.

The term "computer readable medium" as used herein refers to any medium that participates in providing instructions to processor 1404 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1406. Transmission media includes coaxial cables, copper wire, and fiber optics, including wires that comprise bus 1402. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1420 (e.g., LAN, PTSN, or wireless network) may perform the sequence of instructions required to practice the invention in coordination with one another.

Computer system 1400 may transmit and receive messages, data, and instructions, including program, i.e., application code, through communication link 1420 and communication interface 1412. Received program code may be executed by processor 1404 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for enhancing software documentation and help systems, comprising:
    defining a project file for a virtual library;
    creating a document list file for said virtual library;
    deriving a serialized document list file for said virtual library;
    constructing a search index for said virtual library;
    setting an environment variable to link said virtual library to a selected combination of tools; and
    storing the environmental variable in a computer readable medium or displaying the environmental variable on a display device.

2. The method of claim 1 wherein said selected combination of tools is selected from one or more software releases, said one or more software releases comprising a plurality of available tools, said selected combination of tools comprising less than all of said plurality of available tools.

3. The method of claim 2 wherein said selected combination of tools comprises tools from a plurality of software releases.

4. The method of claim 1 wherein defining a project file comprises:
    specifying a project name;
    identifying a path to a documentation and help system; and
    indicating a version information for said documentation and help system.

5. The method of claim 4 further comprising accessing a plurality of virtual libraries through one running instance of said documentation and help system.

6. The method of claim 1 wherein creating a document list file comprises:
    identifying documents associated with said selected combination of tools; and
    specifying paths to said documents associated with said selected combination of tools.

7. The method of claim 6 wherein said documents associated with said selected combination of tools comprises documents having separately rooted paths.

8. The method of claim 1 further comprising establishing a project list file for said virtual library, said project list file containing links to other virtual libraries.

9. The method of claim 1 further comprising specifying a path file for said virtual library, said path file identifying documentation hierarchies.

10. The method of claim 1 further comprising composing a library file.

11. The method of claim 10 wherein composing a library file comprises:
    identifying product or family names for tools in said selected combination of tools; and
    specifying a release hierarchy for each of said product or family names.

12. The method of claim 10 wherein creating a document list file comprises generating said document list file from said library file.

13. The method of claim 10 wherein said serialized document list file is derived from said library file.

14. The method of claim 1 further comprising:
    creating another virtual library for another selected combination of tools; and
    linking said other virtual library to tools in said other selected combination of tools.

15. The method of claim 14 wherein a tool is a part of both of said selected combination of tools.

16. The method of claim 15 further comprising:
    invoking said tool concurrently under both selected combination of tools; and
    dynamically determining which virtual library said tool accesses based upon the selected combination of tools said tool is invoked under.

17. A system for enhancing software documentation and help systems, comprising:
    a processor programmed for:
        defining a project file for a virtual library;
        creating a document list file for said virtual library;
        deriving a serialized document list file for said virtual library;
        constructing a search index for said virtual library;
        setting an environment variable to link said virtual library to a selected combination of tools: and
    a computer readable medium for storing the environmental variable or a display device for displaying the environmental variable.

18. The system of claim 17 wherein said selected combination of tools is selected from one or more software releases, said one or more software releases comprising a plurality of available tools, said selected combination of tools comprising less than all of said plurality of available tools.

19. The system of claim 17, wherein the processor is further programmed for specifying a path file for said virtual library, said path file identifying documentation hierarchies.

20. The system of claim 17, wherein the processor is further programmed for composing a library file, wherein composing a library file comprises:
    identifying product or family names for tools in said selected combination of tools; and
    specifying a release hierarchy for each of said product or family names.

21. The system of claim 17, wherein the processor is further programmed for:
    creating another virtual library for another selected combination of tools; and
    linking said other virtual library to tools in said other selected combination of tools.

22. The system of claim 21 wherein a tool is a part of both of said selected combination of tools.

23. The system of claim 22, wherein the processor is further programmed for:
    invoking said tool concurrently under both selected combination of tools; and
    dynamically determining which virtual library said tool accesses based at least in part upon the selected combination of tools said tool is invoked under.

24. An article of manufacture comprising:
    a computer-readable medium having a volatile or non-volatile medium, the computer readable medium having stored therein instructions which, when executed by a processor, cause a processing system to perform a method for enhancing software documentation and help systems, comprising:

defining a project file for a virtual library;

creating a document list file for said virtual library;

deriving a serialized document list file for said virtual library;

constructing a search index for said virtual library;

setting an environment variable to link said virtual library to a selected combination of tools; and storing the environmental variable or displaying the environmental variable on a display device.

25. The article of manufacture of claim 24 wherein defining a project file comprises:

specifying a project name;

identifying a path to a documentation and help system; and indicating a version information for said documentation and help system.

26. The article of manufacture of claim 25 further comprising accessing a plurality of virtual libraries through one running instance of said documentation and help system.

27. The article of manufacture of claim 24 further comprising specifying a path file for said virtual library, said path file identifying documentation hierarchies.

28. The article of manufacture of claim 24 further comprising composing a library file, wherein composing a library file comprises:

identifying product or family names for tools in said selected combination of tools; and specifying a release hierarchy for each of said product or family names.

29. The article of manufacture of claim 24 further comprising:

creating another virtual library for another selected combination of tools; and linking said other virtual library to tools in said other selected combination of tools.

30. The article of manufacture of claim 29 wherein a tool is a part of both of said selected combination of tools.

31. The article of manufacture of claim 30 further comprising:

invoking said tool concurrently under both selected combination of tools; and dynamically determining which virtual library said tool accesses based upon the selected combination of tools said tool is invoked under.

* * * * *